(12) United States Patent
Schaller

(10) Patent No.: US 11,512,745 B2
(45) Date of Patent: Nov. 29, 2022

(54) SELF-ADJUSTING CLUTCH ACTUATOR

(71) Applicant: KNORR-BREMSE Systeme fuer Nutzfahrzeuge GmbH, Munich (DE)

(72) Inventor: Sebastian Schaller, Langweid (DE)

(73) Assignee: KNORR-BREMSE Systeme fuer Nutzfahrzeuge GmbH, Munich (DE)

(*) Notice: Subject to any disclaimer, the term of this patent is extended or adjusted under 35 U.S.C. 154(b) by 99 days.

(21) Appl. No.: 17/256,436

(22) PCT Filed: Jun. 24, 2019

(86) PCT No.: PCT/EP2019/066653
§ 371 (c)(1),
(2) Date: Dec. 28, 2020

(87) PCT Pub. No.: WO2020/002221
PCT Pub. Date: Jan. 2, 2020

(65) Prior Publication Data
US 2021/0270328 A1    Sep. 2, 2021

(30) Foreign Application Priority Data
Jun. 28, 2018 (DE) ............ 10 2018 210 628.2

(51) Int. Cl.
*F16D 13/75* (2006.01)
*F16D 13/58* (2006.01)
(Continued)

(52) U.S. Cl.
CPC ......... *F16D 13/752* (2013.01); *F16D 13/583* (2013.01); *F16D 25/082* (2013.01);
(Continued)

(58) Field of Classification Search
CPC .... F16D 25/126; F16D 13/752; F16D 13/583; F16D 25/082; F16D 25/087; F16D 2121/04; F16D 2125/06
(Continued)

(56) References Cited

U.S. PATENT DOCUMENTS 2,160,752 A * 5/1939 Oliver ............... F16D 13/75
192/70.252
3,756,361 A * 9/1973 Persson ............... F16D 25/126
188/196 D
(Continued)

FOREIGN PATENT DOCUMENTS

DE     2 140 516 A    2/1972
DE  10 2016 123 777 A1  12/2017
(Continued)

OTHER PUBLICATIONS

International Search Report (PCT/ISA/210) issued in PCT Application No. PCT/EP2019/066653 dated Feb. 4, 2020 with English translation (four (4) pages).
(Continued)

*Primary Examiner* — Richard M Lorence
(74) *Attorney, Agent, or Firm* — Crowell & Moring LLP (57) ABSTRACT

A self-adjusting clutch actuator includes a transmission element displaceable in a displacement direction; and a compensation mechanism having a piston displaceable in the displacement direction of the transmission element. The compensation mechanism allows a first relative displacement (X) of the transmission element relative to the piston in the displacement direction when there is no actuating force in the clutch actuator, and blocks the first relative displacement (X) when an actuating force is introduced into the clutch actuator by bringing a frictional element (4) into contact with a counter-element. The frictional element (4) is designed for a second relative displacement (Y) relative to
(Continued)

the counter-element when the first relative displacement (X) is not blocked by the compensation mechanism (22). A translatory mechanism provided between the transmission element (1) and the piston (2) is designed to cause the second relative movement (Y), by the first relative displacement (X) relative to the counter-element.

18 Claims, 3 Drawing Sheets

(51) Int. Cl.
*F16D 25/08* (2006.01)
*F16D 25/12* (2006.01)
*F16D 121/04* (2012.01)
*F16D 125/06* (2012.01)

(52) U.S. Cl.
CPC ......... *F16D 25/087* (2013.01); *F16D 25/126* (2013.01); *F16D 2121/04* (2013.01); *F16D 2125/06* (2013.01)

(58) Field of Classification Search
USPC .............................. 192/70.252, 85.62, 111.12
See application file for complete search history.

(56) References Cited

U.S. PATENT DOCUMENTS

| | | | |
|---|---|---|---|
| 3,765,522 | A | 10/1973 | Dahlkvist et al. |
| 5,984,072 | A | 11/1999 | Leimbach et al. |
| 2009/0192016 | A1 | 7/2009 | Petzold et al. |
| 2017/0370427 | A1 | 12/2017 | Park et al. |

FOREIGN PATENT DOCUMENTS

| | | |
|---|---|---|
| DE | 10 2017 001 410 A1 | 8/2018 |
| DE | 10 2018 106 503 A1 | 9/2019 |
| WO | WO 2007/134938 A1 | 11/2007 |
| WO | WO-2012119612 A1 * | 9/2012 ........... F16D 25/126 |

OTHER PUBLICATIONS

German-language Written Opinion (PCT/ISA/237) issued in PCT Application No. PCT/EP2019/066653 dated Feb. 4, 2020 (six (6) pages).
International Preliminary Report on Patentability (PCT/IB/326 & PCT/IB/373) issued in PCT Application No. PCT/EP2019/066653 dated Jan. 7, 2021, including English translation (German-language Written Opinion (PCT/ISA/237) filed on Dec. 28, 2020) (eight (8) pages).

* cited by examiner

SELF-ADJUSTING CLUTCH ACTUATOR

The present invention relates to a self-adjusting clutch actuator for wear compensation in clutches.

Clutches, in particular vehicle clutches which are configured as friction clutches, establish a torque-proof connection between an input shaft, which is connected, for example, to an engine, and an output shaft, which is guided, for example, into a transmission, by means of a frictionally locking connection which takes place by way of contact of friction faces, in order to transmit a torque between the two shafts via said torque-proof connection.

In order to establish the frictionally locking connection, for example, the friction faces of the clutch are loaded with a spring-based pressing force which is strong enough that the required torque can be transmitted via said frictionally locking connection. In order to release the frictionally locking connection of the clutch and, as a result, to decouple the two shafts from one another, a force is introduced into the clutch by means of a clutch actuator, which force counteracts the pressing force of the clutch and overcomes said force, with the result that the frictionally locking connection is released.

During operation of the clutch, without a sufficient frictionally locking connection, relative movements between the friction faces which are in contact here at the same time can occur, which leads to abrasion of the friction faces arising. Said increasing abrasion brings about the production of wear in the clutch, which wear becomes correspondingly greater as the operating time of the clutch increases.

In order to counteract said problem, clutch actuators with an automatic length compensation means are known, which length compensation means is configured to automatically displace a transmission element, which applies the force to the clutch, with respect to a second element, which experiences an introduced actuating force, in order thus to compensate for the wear. Here, the length compensation means is released only when no actuating force is applied. If said actuating force is applied, the length compensation means is locked, as a result of which the transmission element and the second element, for example, are blocked, and the actuating force can be applied to the clutch.

Here, the locking action is brought about by way of the frictionally locking contact of two elements which otherwise perform a relative movement on account of the relative displacement of the actuating element.

Clutch actuators of this type have the disadvantage that, in order to achieve a sufficient locking action, they require great areas on the corresponding elements for the frictionally locking contact. As an alternative or in addition, great spacings of the rubbing faces from a rotational axis are also required. This results in a relatively great extent of the elements and therefore of the clutch actuator in a direction which can bring about problems with regard to the required installation space.

It is therefore an object of the present invention to provide a self-adjusting clutch actuator which has the above-described functionality without the associated problems.

Said object is achieved by way of the subject matter of the independent patent claim. Advantageous developments are the subject matter of the subclaims.

According to the invention, a self-adjusting clutch actuator for actuating a clutch is provided, with:

a transmission element which is provided such that it can be displaced in a displacement direction;

a compensation mechanism, with a piston which is provided such that it can be displaced in the displacement direction of the transmission element, the compensation mechanism being configured to enable a relative displacement of the transmission element in the displacement direction with respect to the piston if no actuating force is introduced into the clutch actuator, and to block the relative displacement in the displacement direction if an actuating force is introduced into the clutch actuator, by a friction element being brought into contact in a frictionally locking manner with a mating element, the friction element being configured to carry out a relative movement with respect to the mating element if the relative displacement is not blocked by way of the compensation mechanism, and a transmission mechanism being provided between the transmission element and the piston, which transmission mechanism is configured to bring about the relative movement by way of the relative displacement in the displacement direction of the transmission element with respect to the mating element, and the friction element having a fixed connection to the transmission element in the direction of the relative movement.

The friction element is preferably provided such that it can be displaced, particularly preferably such that it can be displaced in the displacement direction, in order to be brought into contact with the mating element.

The piston is preferably configured in the form of a basket. The piston is particularly preferably configured about at least one axis as a rotationally symmetrical body.

The transmission element is preferably configured as a piston rod. The displacement direction is particularly preferably configured substantially parallel to an axis of the piston rod.

Here, the relative displacement of the transmission element with respect to the piston is oriented substantially parallel to the displacement direction of the transmission element, with the result that the transmission element and the piston are configured to preferably move along said displacement direction.

The transmission element, which is configured, in particular, as a piston rod, and the piston are particularly preferably arranged coaxially, further, non-coaxial designs also being conceivable.

Here, the relative movement of the friction element with respect to the mating element is preferably configured as a rotational movement which particularly preferably takes place about the axis of the transmission element. Rectilinear movements or movements with a rectilinear and rotational component are also possible in further embodiments, however.

The compensation mechanism is preferably configured to bring at least one face of the friction element into contact with the mating element directly and/or via intermediate elements.

The contact between the friction element and the mating element or further friction elements preferably takes place here via a part of the at least one face of the friction element, which face is denoted in the further text as a locking face.

Said locking face is preferably of special configuration for improving a frictionally locking contact, for example by way of the application of special friction linings which have a higher coefficient of friction than the material of the friction elements. Suitable configurations for this purpose are known to a person skilled in the art from the prior art.

The mating element also preferably has a comparable locking face.

The mating element is preferably the piston. This can advantageously achieve a situation where a separate component is saved, and a direct frictionally locking connection can be established between the piston and the friction element and therefore between the piston and the transmission element in the direction of the relative movement.

The piston is preferably configured as a basket, the friction element particularly preferably being arranged within the basket. There is therefore the possibility for the compensation mechanism to be configured within the piston.

The clutch actuator or the compensation mechanism is preferably configured in such a way that the relative movement of the friction element with respect to the mating element is at most as large as, preferably smaller than, the relative displacement in the displacement direction of the transmission element with respect to the piston.

In the case of a rectilinear relative movement, this means that the relative displacement X of the transmission element with respect to the piston brings about a relative movement Y of the friction element with respect to the mating element, the magnitude of which relative movement Y is likewise at most as great as that of the relative displacement X.

If, in contrast, the relative movement Y is a rotational movement or a movement at least with a rotational component, a reference point on the friction element or the mating element is to be selected, the travel through which said reference point passes then being considered as a relative movement Y.

In the case of a purely rotational movement, a point can preferably be selected which is situated on an effective diameter of the locking face.

An effective diameter is to be understood to mean the diameter, on which all the individual friction forces of the locking face would act in a concentrated manner, in order to achieve said locking action.

As an alternative, any desired point on the friction element, preferably on the external diameter or the circumference, can also be selected.

Here, the configuration of the friction element and/or the mating element as a body which is rotationally symmetrical about at least one axis, preferably the rotational axis, is not absolutely necessary.

A relative movement Y can then be calculated in accordance with the circular segment passed through by the selected point.

The following applies in every case:

$$Y_{friction\ element-mating\ element} \leq X_{transmission\ element-piston}$$

Regardless of whether there is a translational or rotational relative movement, it is preferred that the relative displacement X and the relative movement Y correspond in terms of their magnitudes, that is to say are of equal magnitude:

$$Y_{friction\ element-mating\ element} = X_{transmission\ element-piston}$$

The clutch actuator, in particular the compensation mechanism, preferably has an activation element. The latter preferably has a clamping element which is configured to bring the friction element into a frictionally locking connection with the mating element and/or with further elements.

Here, the clamping element is preferably configured as a floating piston.

The activation element, particularly preferably the clamping element, is preferably configured to establish the contact between the friction element and the mating element if an actuating force is introduced into the clutch actuator.

The activation element, particularly preferably the clamping element, is preferably provided such that it can be displaced, and is provided on or in the piston. The activation element, particularly preferably the clamping element, particularly preferably has an end position relative to the piston, particularly preferably an end stop position.

Here, the activation element, in particular the floating piston, can be displaced in the piston preferably in the displacement direction of the transmission element. In the case of a displacement in said direction, the activation element is preferably configured to bring the at least one friction element and the mating element into contact.

In one preferred embodiment, at least one friction element which is connected to the transmission element is brought into contact in this way by way of at least one face with the mating element and by way of at least one further face with the activation element, in particular with the clamping element, as the result of which a frictionally locking connection is produced on at least two faces of the friction element. As a result, a locking action of the compensation mechanism can be realized in an effective way in a comparatively small installation space.

The transmission mechanism between the transmission element and the piston preferably has a thread, in particular a transmission thread, the transmission element and the piston being in contact with one another via the thread.

In this way, a relative displacement of the transmission element with respect to the piston can be converted into a rotational movement. The friction element which is connected to the transmission element fixedly in the direction of the relative movement therefore rotates with the transmission element relative to the piston and therefore the mating element. Therefore, a relative movement of the friction element with respect to the mating element can be achieved.

The clutch actuator, in particular the compensation mechanism, preferably has at least one friction element which is connected to the piston fixedly in the direction of the relative movement and which is configured to be brought into contact with at least one friction element which is connected to the transmission element fixedly in the direction of the relative movement. The friction element which is connected to the piston fixedly in the direction of the relative movement is preferably provided such that it can be displaced, particularly preferably such that it can be displaced in the direction of the relative displacement.

The clutch actuator preferably has at least one further friction element which is connected to the transmission element fixedly in the direction of the relative movement and is configured to be brought into contact with at least one friction element which is connected to the piston fixedly in the direction of the relative movement, and/or with the mating element. Said at least one further friction element is preferably provided such that it can be displaced, particularly preferably such that it can be displaced in the direction of the relative displacement.

The friction elements which are provided in the piston and/or on the transmission element preferably have at least one locking face which is configured as described above.

The activation element, particularly preferably the clamping element, preferably has at least one locking face which is configured as described above.

Therefore, by way of the provision of further friction elements which are preferably arranged in an alternating manner along the axis of the transmission element, the number of locking faces which can be brought into contact can be increased, as a result of which the resulting friction force is increased per locking face contact. As a result, the locking action of the compensation mechanism is increased.

The friction elements are preferably arranged in an alternating manner in the displacement direction, and/or the friction elements are preferably flanked by the piston, particularly preferably by the mating element, and the activation element, in particular the clamping element.

As a result of the flanking of the friction elements by way of the piston and the activation element, all the friction elements can be connected to the piston and/or the mating element and the clamping element in a frictionally locking manner, in particular in the direction of the relative movement.

The clutch actuator preferably has at least one spring element, in particular a spiral spring, which is preferably configured, if no actuating force is introduced into the clutch actuator, to load the transmission element with a force counter to the force of a diaphragm spring of the clutch.

The spring element is preferably supported directly or via intermediate elements between the transmission element and the piston.

The spring element can thus advantageously be used to counteract the force of the diaphragm spring of the clutch and to prestress the compensation mechanism if it is not blocked, with the result that, in the case of application of an actuating force, an immediate introduction of the actuating force into the clutch can take place.

A spring element is preferably provided which is configured to load the activation element, in particular the clamping element, with a force which loads the activation element, in particular the clamping element, away from the at least one friction element.

The spring element is preferably configured as a cup or spiral spring, and/or as an elastic ring element, preferably with a hollow profile, particularly preferably with a rectangular profile, which is particularly preferably supported within the piston.

This can advantageously achieve a situation where the activation element, in particular the clamping element, if no actuating force is applied, is spaced apart from the at least one friction element and is transferred into an end position, preferably into an end stop position. As a result, the compensation mechanism is not blocked, and the length compensation of the transmission element can take place.

The activation element, in particular the clamping element, is preferably configured such that it can be loaded with an actuating force, or, in addition to the activation element, the piston is configured such that it can be loaded with the actuating force. Here, the activation element and/or the piston form/forms elements which are configured for the introduction of an actuating force.

The actuating force can preferably be applied mechanically and/or pneumatically and/or hydraulically and/or electrically and/or magnetically.

The clutch actuator which is described in this manner can be loaded in this way with an actuating force in various ways, which allows the clutch actuator to be provided in different systems, in particular in different drive systems.

The clutch actuator preferably has a housing which, with the piston, configures a pressure space which is configured to be connected to a pressure source, in order to apply the actuating force to the activation element, in particular the clamping element, or to the piston and the activation element, in particular the clamping element.

In this preferred embodiment, a hydraulic or pneumatic actuation of the clutch actuator can be realized in this way, as a result of which the attachment of the clutch actuator to further elements, such as, for example, a pressure control valve or a pressure accumulator, can take place in a relatively flexible manner on account of bendable pressure lines.

A stop is preferably provided in the housing, against which stop the piston can be brought to bear in its end stop position.

The piston is preferably received in the housing such that it can be displaced in the displacement direction.

Furthermore, it is to be noted that a piston and a piston rod are always used for the release of the clutch in the embodiments which have been described up to now. Here, the term "piston" is not to be interpreted narrowly. A person skilled in the art usually understands a piston to be an element from mechanical engineering which is preferably configured such that it can be displaced in a housing in one direction, the piston and the housing configuring a pressure space which can be loaded with a pressure force by means of a pressure medium which is situated in said pressure space or introduced into said pressure space. The piston is moved by means of the pressure force, generally in a manner guided by the housing. The term "piston" is to be interpreted more broadly in the case of the present invention, however. This is generally an element which is configured for absorbing an actuating force, in order to transmit said actuating force to the piston rod. The absorbing of the actuating force can preferably take place here by way of pressurization, but also by means of other possibilities, as described further above. Said actuating force can be applied to the piston directly or via intermediate elements. Accordingly, an element of this type can therefore be configured, in particular, as a disk or merely as a projection, to which the actuating force can be transmitted. As a consequence, the piston rod is also generally to be considered as a rod or bar with an axis. Here, the piston rod is provided such that it can be displaced along its axis.

In the following text, preferred embodiments of the invention are described by means of the appended drawings, in which, in detail.

Figure 1:
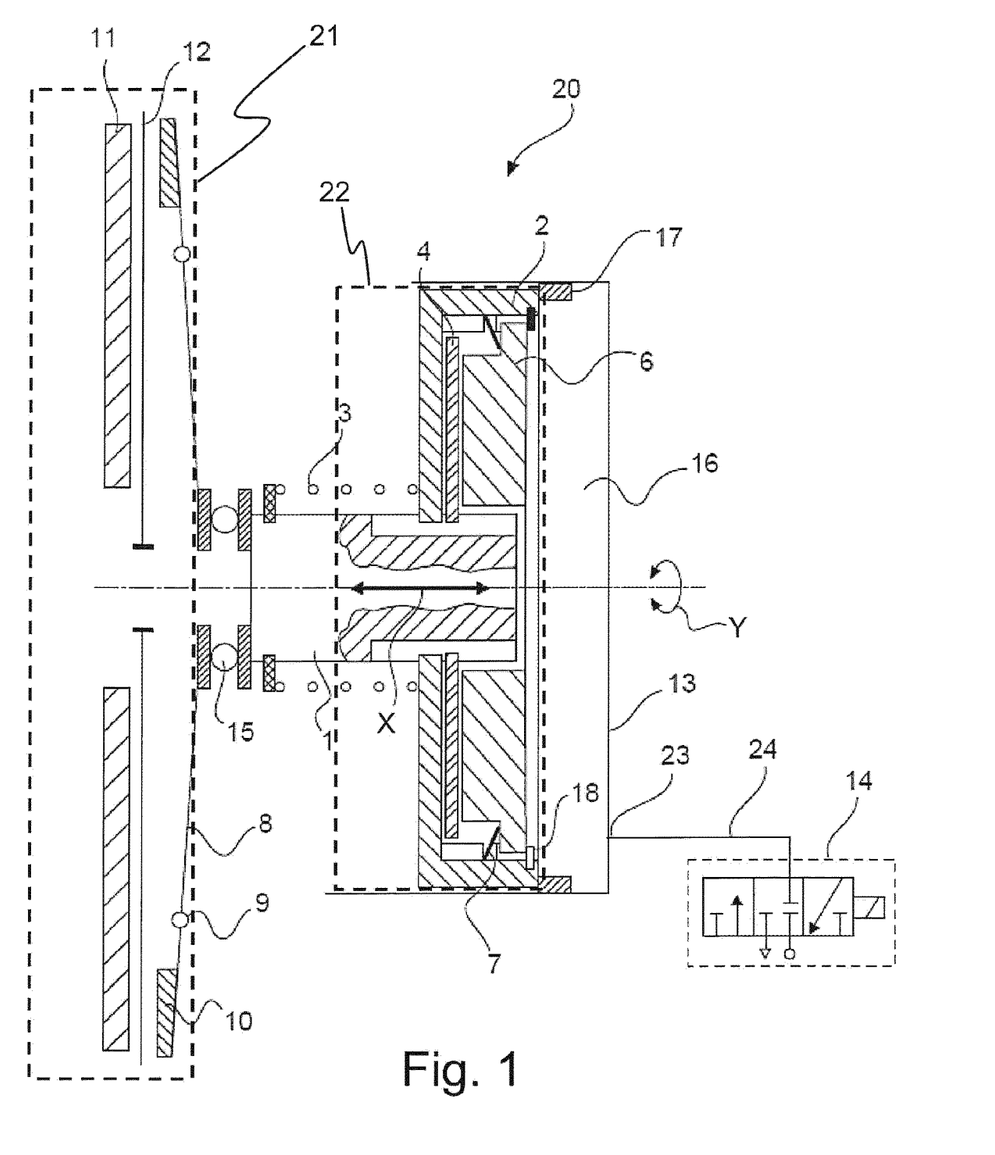
FIG. 1 shows one embodiment of the clutch actuator in a central design.

A clutch actuator 20 with a compensation mechanism 22 is shown, which clutch actuator 20 is arranged coaxially in a central embodiment with respect to a clutch 21. Here, the clutch 21 substantially comprises a disk flywheel 11, a clutch disk 12 and a diaphragm spring 8. The diaphragm spring 8 is configured such that it can be pivoted about pivot points 9, pressure plates 10 with friction linings being provided at its ends. A release bearing 15 is provided coaxially in the central position of the diaphragm spring 8. By means of a force on the release bearing toward the left, the diaphragm spring 8 is rotated about the pivot points 9, as a result of which the pressure plates 10 are spaced apart from the clutch disk 11, which results in the clutch 21 then being situated in the disengaged state. The clutch 21 described herein is merely of exemplary configuration, in order to describe the method of operation of the clutch actuator 20, and does not have a restrictive effect on the subject matter of the invention. The representation of the constituent parts of the clutch 21 is also to be understood merely diagrammatically, and does not call into question the method of operation of the clutch actuator 20.

A transmission element 1 in the form of a piston rod 1 of the clutch actuator 20 is adjacent to the right of the release bearing 15, which piston rod 1 is arranged coaxially and therefore centrally with respect to the clutch 21 and abuts with its end side against the release bearing 15. A friction element 4 is arranged on the piston rod 1, which friction element 4 is connected fixedly to the piston rod 1 so as to rotate with it, but is at the same time of axially displaceable configuration. The connection between the piston rod 1 and the friction element 4 is configured, for example, as an axially extending tongue and groove connection which permits an axial displacement of the friction element 4.

Furthermore, a piston 2 is shown in the form of a basket which is open toward the right and which is arranged coaxially with respect to the piston rod 1. The piston 2 is connected to the piston rod 1 by means of a transmission thread (not shown), the piston rod 1 penetrating the piston 2. The transmission thread is configured, for example, as an external thread on the circumference of the piston rod 1, which external thread is in engagement with an internal thread in the piston 2. Furthermore, a spring 3 is shown which is situated between the piston rod 1 and the piston 2 and applies a spring force between the two in the axial direction of the piston rod 1. The supporting of said spring force on the piston rod 1 can take place, for example, on an inserted ring as shown, or on a shoulder of the piston rod 1 or the like.

An activation element with a clamping element 6 in the form of a floating piston 6 is arranged within the piston 2, which floating piston 6 is connected fixedly to the piston 2 within the latter so as to rotate with it, but at the same time is configured such that it can be displaced in the axial direction. One embodiment of said connection can be configured, for example, like the connection between the piston rod 1 and the friction element 4, the groove being situated, for example, in the piston 2. In the illustration which is shown, the floating piston 6 is pressed into an end stop position, which is defined by way of a securing ring 18, by way of a spring element 7, configured as a cup spring, which is supported within the piston 2, for example in a circumferential groove of the piston 2.

In the illustration which is shown, the piston 2 is situated in its end stop position which is defined by way of a stop 17. Here, the stop 17 is of stationary configuration with respect to the piston 2.

Furthermore, the embodiment which is shown has a housing 13, in which the stop 17 is configured. The piston 2 is received within the housing 13 such that it slides in the axial direction. The housing 13 and the compensation mechanism 22, in particular, however, the piston 2, define a pressure space 16. The latter has an opening 23 which is configured for the connection to a pressure line 24. The pressure line 24 is adjoined by a valve 14 which is configured as a pneumatic or hydraulic valve 14 in this embodiment.

It is possible by way of the valve 14 to load the pressure space 16 with a pressure medium, in particular with compressed air, with the result that the compensation mechanism 22, in particular the floating piston 6 and the piston 2, can experience a pressure force toward the left out of the pressure space 16.

The method of operation of the clutch actuator 20 which is shown, in particular of its compensation mechanism 22, is as follows:

In the position which is shown, the pressure space 16 is not filled with a pressure medium and/or is not loaded with pressure. As a result, the floating piston 6 is spaced apart from the friction element 4 by way of the spring element 7. It is situated in its end stop position on the securing ring 18. Furthermore, the piston 2 is likewise in its end stop position, said piston 2 bearing against the stop 17.

A force from the diaphragm spring 8 of the clutch 21 acts on the piston rod 1 from the left via the release bearing 15 in the axial direction of the piston rod 1. Said force is counteracted by the force of the spring 3.

Since, as shown, the piston 2, the friction element 4 and the floating piston 6 are spaced apart, a relative movement Y of the friction element 4 with respect to the piston 2 or the floating piston 6 is possible. In this embodiment, this is a rotational movement about the common axis.

A rotational movement of this type is brought about by way of an axial relative displacement X of the piston rod 1 with respect to the piston 2, since, in the case of an axial relative displacement X with respect to the piston 2, the piston rod 1 is set in rotation on account of the thread between the piston rod 1 and the piston 2.

If wear is then produced within the clutch 21 as a result of abrasion of the pressure plate 10, said wear brings about, in the case of an engaged clutch 21, a relative displacement X of the release bearing 15 beyond the illustrated position toward the right. Accordingly, the piston rod 1 has to permit said relative displacement X, in order that the clutch can still be engaged even with pressure plates 10 which are worn to a more pronounced extent.

In the illustrated arrangement, this compensation takes place by way of the forces of the diaphragm spring 8 and of the spring 3 which are introduced into the release bearing 15, which diaphragm spring 8 is supported from the left in the release bearing 15, and which spring 3 is supported via the stop 17, the piston 2 and the piston rod 1 in the release bearing 15. Here, the relative displacement X of the piston rod 1 with respect to the piston 2 takes place until the clutch 21 is engaged completely. Here, the piston rod 1 and the friction element 4 carry out a rotational relative movement Y with respect to the piston 2.

If the clutch 21 is then to be disengaged, the pressure space 16 is filled with a pressure medium, in particular compressed air, via the valve 14, the pressure line 24 and the opening 23 in the exemplary embodiment which is shown, as a result of which the pressure on the floating piston 6 and the piston 2 is increased. Here, the floating piston 6 moves counter to the force of the spring element 7 to the left toward the friction element 4. This is continued until the floating piston 6 comes into contact with the friction element 4. Subsequently, they are both displaced further to the left by way of the pressure in the pressure space 16 until the friction element 4 abuts by way of its left-hand surface against the piston 2. In this way, the piston 2, the friction element 4 and the floating piston 6 are connected to one another in a frictionally locking manner.

As a consequence, the friction element 4 can then no longer rotate with respect to the piston 2. Therefore, a rotational movement of the piston rod 1 with respect to the piston 2 is also blocked, which at the same time blocks the relative displacement X of the piston rod 1 with respect to the piston 2. The piston rod 1, the piston 2, the friction element 4 and the floating piston 6 are then connected in a frictionally locking manner to form a unit which can be displaced to the left counter to the force of the diaphragm spring 8 by way of the pressure in the pressure space 16. It is therefore possible for the force which is produced by way of the pressure in the pressure space 16 to be introduced in the axial direction via the piston rod 1 into the release bearing 15, as a result of which the force of the diaphragm spring 8 of the clutch 21 can be overcome, and the clutch 21 can be transferred into a released position.

The embodiment which is shown has the advantage that both the left-hand and the right-hand surface of the friction element 4 are brought into contact with the piston 2 and/or the floating piston 6. Here, the contact takes place on an annular locking face which is part of the surface of the friction element 4 and, in this embodiment, is arranged around the axis of the piston rod 1. Here, this face represents the effective surface of the locking mechanism and can be characterized, for example, by an effective diameter which is measured, for example, from the center of the friction element 4 as far as the point which lies on the outer circumference of the annular locking face.

As a result, a friction force which counteracts the relative movement Y of the friction element 4 with respect to the piston 2 acts on the friction element 4, said frictional force being twice as high, in the case of an identical pressing force on the surfaces and an identical extent and position of the locking faces, in comparison with an embodiment in the case of which merely one locking face of the friction element 4 is brought into contact, for example, with the piston 2. It is therefore possible for the friction element 4 to be of smaller configuration in the radial extent direction, that is to say in its diameter, as a result of which clutch actuators 20 with a more compact overall construction in the radial direction can be provided.

Figure 2:
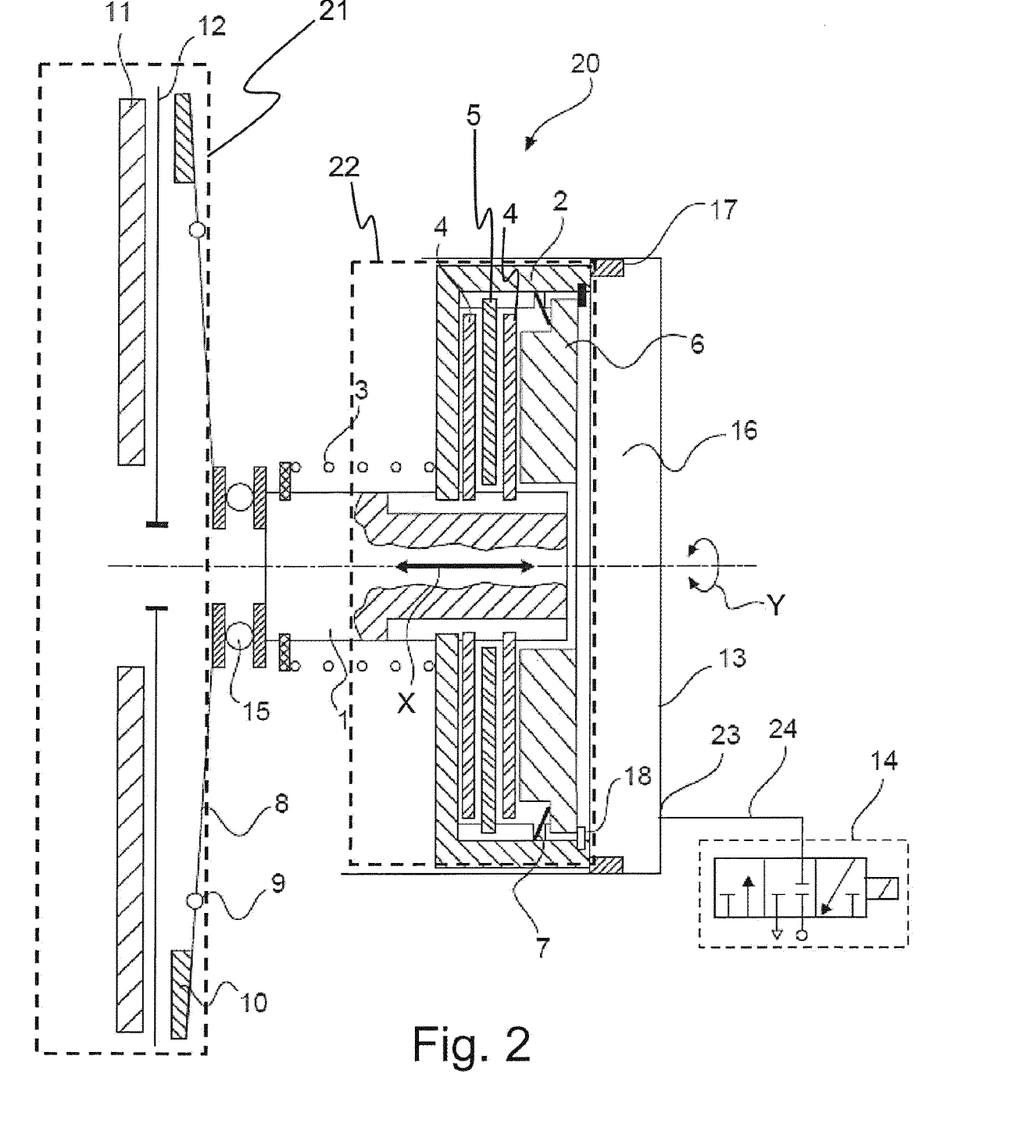
FIG. 2 shows a further embodiment of the clutch actuator in a central design.

FIG. 2 shows one development of said embodiment.

The construction of the clutch actuator 20 is substantially identical to that from FIG. 1; therefore, merely the structural differences will be described in the following text.

The compensation mechanism now has two friction elements 4 which are connected to the piston rod 1 in the same way as in FIG. 1. In addition, a further friction element 5 is provided which is arranged between the friction elements 4 and is connected to the piston 2 fixedly so as to rotate with it but such that it can be displaced axially. The connection can likewise be configured like the connection between the piston 2 and the floating piston 6.

The method of operation of the compensation mechanism 22 is the same in this embodiment as that from FIG. 1, but, in this embodiment, a plurality of friction elements 4, 5 are brought into contact in the case of loading of the pressure space 16 with a pressure medium, in particular compressed air. Specifically, four contact points can be seen here within the arrangement comprising the piston 2, the friction elements 4, 5 and the floating piston 6, at which contact points a frictionally locking connection in the direction of the relative movement can be established. This means that, in the case of a frictionally locking connection of said elements, double the frictional force acts within the compensation mechanism 22 in comparison with the embodiment from FIG. 1, in which merely two contact points can be seen. There is therefore the structural advantage here that, in order to achieve the same locking action of the compensation mechanism 22 as in the case of that in FIG. 1, in the case of an identical pressing force on the individual locking faces, merely friction faces 4, 5 with half the effective diameter of the locking faces have to be installed. Therefore, a reduction of the diameter of the compensation mechanism is possible by way of an increase of the number of contact points between the friction elements 4, 5, that is to say with an increase of the number of friction elements 4, 5.

Figure 3:
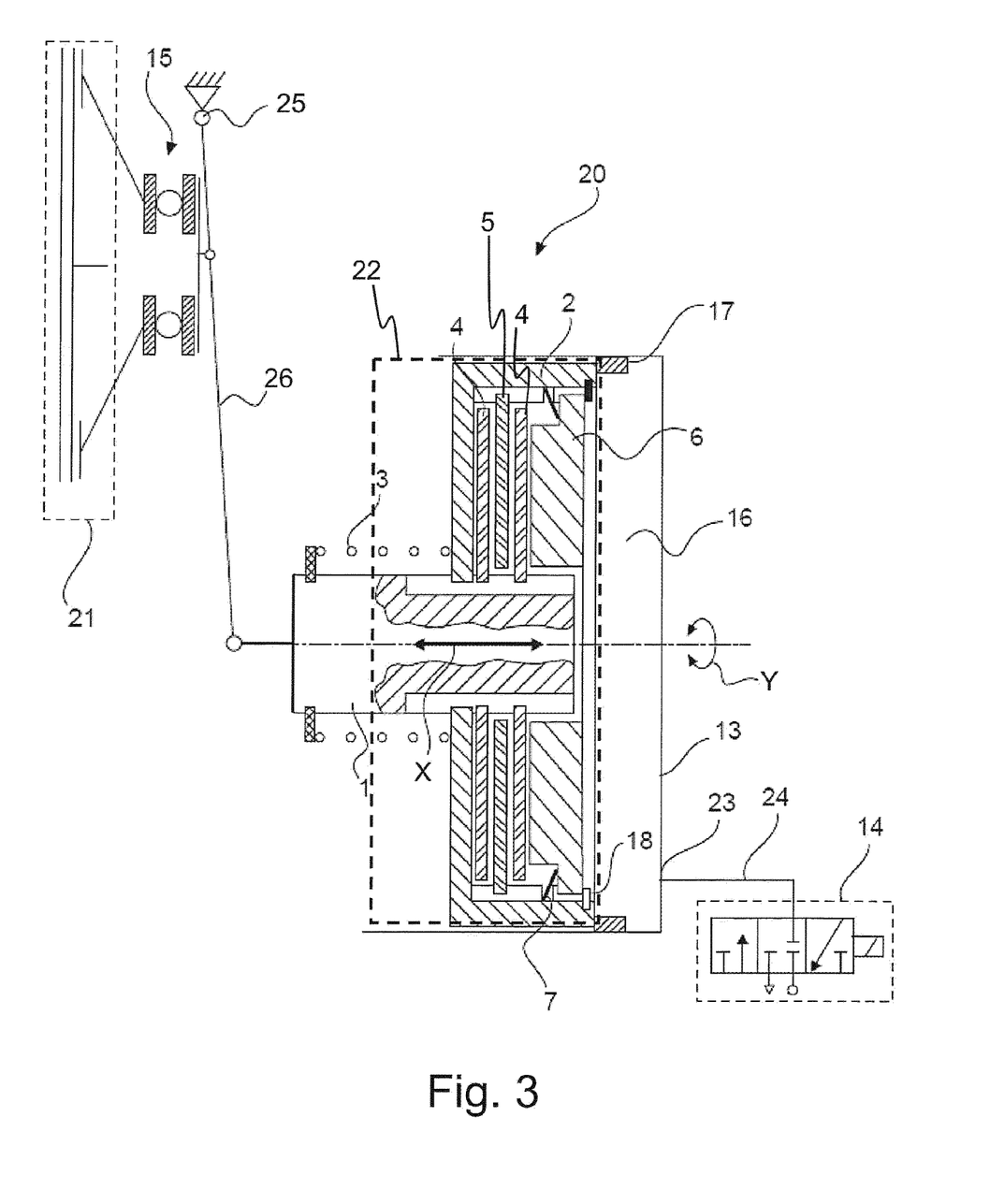
FIG. 3 shows one embodiment of the clutch actuator in a non-central design.

FIG. 3 shows a further attachment option of the clutch actuator 20 from FIG. 2 to the clutch 21.

Here, the clutch actuator 20 is identical to the clutch actuator from FIG. 2. Differences consist in the attachment of the clutch 21 to the piston rod 1.

Here, the piston rod 1 is in contact with a release lever 26 which is configured such that it can be pivoted about a pivot point 25. Furthermore, said release lever 26 is connected to the release bearing 15 of the clutch 21.

This construction has the advantage that a transmission ratio, in particular a lever transmission ratio, of the force which is necessary for disengaging the clutch 21 can take place via skillful positioning of the attachment points of the piston rod 1 and the release bearing 15 to the release lever 26, with the result that the pressure in the pressure space 16 can be selected to be lower than in the case of the embodiments in a central design, as shown in FIGS. 1 and 2.

Otherwise, the method of operation is identical to the embodiment in FIG. 2.

The embodiments which are shown do not have a restrictive effect on the subject matter of the invention. Rather, moreover, further embodiments are conceivable which, however, do not call the principle according to the invention into question. For example, a clutch actuator 20 of this type can also be actuated in a purely mechanical manner, by the actuation by means of pressure being dispensed with and, instead, the floating piston 6 being configured, for example, as a pressure plate which can be loaded by way of a mechanically introduced force, for example by means of a linkage. Furthermore, embodiments are conceivable which are likewise covered by the scope of the claimed subjects, in the case of which embodiments the floating piston 6 is actuated magnetically, electrically and/or electromechanically. A configuration of a pressure space 16 in the housing 13 would no longer be absolutely necessary in the case of said embodiments.

The embodiments which are described herein do not limit the subject matter of the invention thereto, but rather show merely preferred embodiments of the invention. Moreover, further embodiments are conceivable which can be obtained by way of combination or deletion of individual features of different embodiments. For example, a configuration of stops 17 for the piston 2 is not absolutely necessary. The piston 2 can also assume end positions which are not defined by way of a stop 17. The same also applies to the end position of the floating piston 6 or the clamping element 6, which end position likewise does not necessarily have to have a stop.

LIST OF DESIGNATIONS

1 Transmission element, piston rod
2 Piston
3 Spring
4 Friction element
5 Friction element
6 Clamping element, floating piston
7 Spring element
8 Diaphragm spring
9 Pivot point
10 Pressure plate
11 Disk flywheel
12 Clutch disk
13 Housing
14 Valve
15 Release bearing
16 Pressure space 17 Stop
18 Securing ring
20 Clutch actuator
21 Clutch
22 Compensation mechanism
23 Opening
24 Pressure line
25 Pivot point
26 Release lever
X Relative displacement (piston rod 1 with respect to piston 2 in axial direction)
Y Relative movement (friction element 4 with respect to mating element, in particular with respect to piston 2)

What is claimed is:

1. A self-adjusting clutch actuator, comprising:
a transmission element configured for displacement in a displacement direction;
a compensation mechanism having a piston configured for displacement in the displacement direction, the compensation mechanism being configured to enable a first relative displacement of the transmission element in the displacement direction relative to the piston if no actuating force is introduced into the clutch actuator, and to block the first relative displacement in the displacement direction if an actuating force is introduced into the clutch actuator by a first friction element brought into contact in a frictionally locking manner with a mating element, the first friction element being configured to carry out a second relative movement with respect to the mating element if the first relative displacement is not blocked by the compensation mechanism; and
a transmission mechanism arranged between the transmission element and the piston, the transmission mechanism being configured to cause the second relative movement by way of the first relative displacement in the displacement direction of the transmission element relative to the mating element,
wherein
the first friction element has a fixed connection to the transmission element in the direction of the second relative movement, and
the compensation mechanism is configured to bring at least two faces of the first friction element into contact with the mating element directly, via at least one intermediate element, or both directly and via the at least one intermediate element.

2. The self-adjusting clutch actuator of claim 1, wherein the piston is the mating element.

3. The self-adjusting clutch actuator of claim 1, wherein the piston is configured as a basket, and
the first friction element is arranged within the basket.

4. The self-adjusting clutch actuator as claimed in claim 1, wherein
the second relative movement of the first friction element relative to the mating element is less than or equal to the first relative displacement in the displacement direction of the transmission element relative to the piston.

5. The self-adjusting clutch actuator as claimed in claim 4, further comprising:
an activation element having a clamping element configured to bring the first friction element into a frictionally locking connection with the mating element, further elements or both the mating element and the further elements, when the clutch actuator is loaded with the actuating force.

6. The self-adjusting clutch actuator as claimed in claim 5, wherein
the clamping element is a floating piston in the piston.

7. The self-adjusting clutch actuator as claimed in claim 6, wherein
the transmission mechanism between the transmission element and the piston includes a transmission thread by which the transmission element and the piston are in contact with one another.

8. The self-adjusting clutch actuator as claimed in claim 7, further comprising:
at least one second friction element connected fixedly to the piston in the direction of the second relative movement, the at least one second friction element being configured to be brought into contact with the first friction element connected to the transmission element fixedly in the direction of the second relative movement.

9. The self-adjusting clutch actuator as claimed in claim 5, wherein
the clamping element is configured to be loaded with the actuating force, or
in addition to the activation element, the piston is configured to be loaded with the actuating force.

10. The self-adjusting clutch actuator as claimed in claim 9,
the actuating force is applied mechanically, pneumatically, hydraulically, electrically, magnetically, or a combination of at least two of mechanically, pneumatically, hydraulically, electrically, magnetically.

11. The self-adjusting clutch actuator as claimed in claim 4, further comprising:
a spring element configured to load the clamping element away from the first friction element.

12. The self-adjusting clutch actuator as claimed in claims 4, further comprising:
a housing configured to cooperate with the piston to define a pressure space, the pressure space being configured to receive pressure from a pressure source to generate the actuating force to be applied to the clamping element or to the piston the clamping element.

13. The self-adjusting clutch actuator as claimed in claim 12, further comprising:
a stop arranged in the housing against such that the piston bears against the stop in the end stop position of the piston,
wherein the piston is arranged in the housing and is displaceable in the displacement direction.

14. The self-adjusting clutch actuator as claimed in claim 1, further comprising:
at least one further first friction element connected to the transmission element fixedly in the direction of the second relative movement, the at least one further first friction element being configured to be brought into contact with at least one friction element which is connected to the piston fixedly in the direction of the second relative movement, with the mating element, or with both the at least one friction element which is connected to the piston fixedly in the direction of the second relative movement and the mating element.

15. The self-adjusting clutch actuator as claimed in claim 14, wherein
the friction elements are arranged in an alternating manner in the displacement direction, and
the mating element and the clamping element flank the friction elements.

16. The self-adjusting clutch actuator as claimed in claim 1, further comprising:
a spring element configured to load the transmission element with a force counter to the force of a diaphragm spring of the clutch if the actuating force is not introduced into the clutch actuator.

17. The self-adjusting clutch actuator as claimed in claim 16, wherein
the spring element is supported directly or via intermediate elements between the transmission element and the piston, and
the spring element is configured as a cup or spiral spring or an elastic ring element with a hollow rectangular profile.

18. The self-adjusting clutch actuator as claimed in claim 1, wherein
the second relative movement is a rotational movement, a translational movement, or a movement with a rotational component and a translational component.

* * * * *